US008250018B2

(12) United States Patent
Wong et al.

(10) Patent No.: US 8,250,018 B2
(45) Date of Patent: Aug. 21, 2012

(54) ENGINEERING EXPERT SYSTEM

(75) Inventors: Chiak Wu Wong, Singapore (SG);
Aaric Chee Meng Lai, Singapore (SG);
Huong Giang Tran, Singapore (SG)

(73) Assignee: Novartis AG, Basel (CH)

( * ) Notice: Subject to any disclaimer, the term of this patent is extended or adjusted under 35 U.S.C. 154(b) by 900 days.

(21) Appl. No.: 12/214,347

(22) Filed: Jun. 18, 2008

(65) Prior Publication Data
US 2008/0319936 A1    Dec. 25, 2008

(30) Foreign Application Priority Data
Jun. 21, 2007 (SG) .............................. 200704647.7

(51) Int. Cl.
*G06N 5/00* (2006.01)
(52) U.S. Cl. ........................................ 706/47; 706/45
(58) Field of Classification Search ............. 706/47, 706/45
See application file for complete search history.

(56) References Cited

U.S. PATENT DOCUMENTS

| | | | |
|---|---|---|---|
| 5,063,522 A | 11/1991 | Winters | |
| 5,175,800 A * | 12/1992 | Galis et al. ............... | 706/45 |
| 5,241,619 A | 8/1993 | Schwartz | |
| 5,293,585 A | 3/1994 | Morita | |
| 5,442,792 A | 8/1995 | Chun | |
| 5,487,134 A | 1/1996 | Ballard | |
| 5,542,024 A | 7/1996 | Balint | |
| 5,689,417 A | 11/1997 | Shockley | |
| 5,706,406 A | 1/1998 | Pollock | |
| 5,724,258 A * | 3/1998 | Roffman ............... | 702/108 |
| 5,778,150 A | 7/1998 | Chan | |
| 6,169,981 B1 | 1/2001 | Werbos | |

(Continued)

FOREIGN PATENT DOCUMENTS
EP    0333635 A2    9/1989
(Continued)

OTHER PUBLICATIONS

Wazel, An Expert System Shell Performing the Generic Task of Hierarchical Classification, Master's Thesis, Technical Report: MU-SEAS-CSA-1993-000, Miami University, 1993, pp. 1-193.*

(Continued)

*Primary Examiner* — Wilbert L Starks
(74) *Attorney, Agent, or Firm* — Sheng Hsin Hu

(57) ABSTRACT

An expert system aids engineering personnel working in a manufacturing or other industrial environment by answering questions relating to machines, processes, systems or other elements of the environment. Users can interact with the system using kiosks in the relevant areas of the plant to enter queries and receive answers. A user can enter a query in a natural language format, which the system parses for keywords or keyterms. The system can use a backward chaining method to reach a solution, based upon the user's answer to further questions that the system asks the user.

17 Claims, 20 Drawing Sheets

U.S. PATENT DOCUMENTS

| | | |
|---|---|---|
| 7,032,114 B1 | 4/2006 | Moran |
| 7,230,529 B2 | 6/2007 | Ketcherside, Jr. |
| 7,705,727 B2 | 4/2010 | Pestotnik et al. |
| 7,809,601 B2 * | 10/2010 | Shaya et al. ............ 705/7.31 |
| 2002/0157021 A1 | 10/2002 | Sorkin |
| 2003/0105390 A1 | 6/2003 | Alessandri |
| 2004/0037474 A1 | 2/2004 | Happel |
| 2004/0210548 A1 | 10/2004 | Ketcherside, Jr. |
| 2005/0257132 A1 | 11/2005 | Karby |
| 2005/0275558 A1 | 12/2005 | Papadimitriou |
| 2006/0195463 A1 | 8/2006 | Bogner |
| 2006/0229777 A1 | 10/2006 | Hudson |
| 2007/0213602 A1 | 9/2007 | Ketcherside, Jr. |

FOREIGN PATENT DOCUMENTS

| | | |
|---|---|---|
| EP | 0415168 A2 | 3/1991 |
| EP | 1459684 A1 | 9/2004 |
| WO | 2004021202 A1 | 3/2004 |
| WO | 2004072795 A2 | 8/2004 |

OTHER PUBLICATIONS

Austrian Patent Office Search Report and Examination Report for Singapore Application No. 200704647-7, Filing Date: Jun. 21, 2007 Date of Mailing: Sep. 29, 2009.

* cited by examiner

ERNIES

Please enter your question

[                                                                      ]

How to ask question?

Example: What is linear table

Fig. 5

ERNIES

Please select related items below or send us your feedbacks.

- What is it?
- What is peristaltic pump?
- What is bearing bolt?
- What is ultra sonic?
- What is ultra sonic station?
- What is feeding belt?
- How to test ultrasonic controller?
- How to replace shell feed belt?
- How to replace hp water filler?
- How to endroller on the shell feed belt?
- How to replace differential filter?
- How to adjust belt tension-runout on hopper?
- Why is there bubble with tear on LT?
- Why is there tool closing error message on LT due to single tool?
- Why is there tool closing error message on LT?

Fig. 6

ERNIES
Recommendation

Your name:

Your Question: What is linear Table?

Select : Print   or   Rate this

Rating: _____

The linear table produces one-day contact lenses fully automatically. A liquid polymeric material is used as the raw material to form a lens in the glass molds consisting of male molds and female molds.

Fig. 7

ERNIES
Recommendation

Your name:

Your Question: How to calibrate the sonic sensor?

Select : Print   or   Rate this              Rating: _____

1) Ensure sonic sensor is clean and has no condensation on it.

2) Place 100 ml of cold water in an empty PVA bottle.

3) With bottle in container connect air pressure and ensure pressure is set to 2 bar.

4) Check reading on TP-37 control panel at the top for the vessel you are adjusting and see if volume is at 10%, if so skip to step 14.

5) Connect the analog/digital converter to the PC in Con 2.

6) Open the access panel on the back side of the dosing vessel stand.

Fig. 8

ERNIES

Please answer the following questions

Looking at tool layout, what is the trend of low yield?

- ❏ Position Related
- ❏ Particular Tool
- ❏ Not sure select : next or go back

Fig. 9

| Field Name | Data Type | Description |
|---|---|---|
| ObjectKey | Text | Object to be asked (ex: star gripper...) |
| Area | Text | Area of the object (ex: PP line...) |
| Answer | Memo | Answer to be displayed to users |
| PicturePath | Text | Path of picture related to the answer (in server) |
| Picture | Text | Picture name |
| File | Text | File related to the answer |

FIG. 11

| Field Name | Data Type | Description |
|---|---|---|
| ObjectKey | Text | Object to be asked (ex: star gripper...) |
| Area | Text | Area of the object (ex: PP line...) |
| Answer | Memo | Answer to be displayed to users |
| PicturePath | Text | Path of picture related to the answer (in server) |
| Picture | Text | Picture name |
| File | Text | File related to the answer |

FIG. 12

| Field Name | Data Type | Description |
|---|---|---|
| ProcedureID | Number | Index number (ex: 1, 2...) |
| ObjectKey | Text | Object to be asked (ex: sonic sensor...) |
| Action | Text | Action performed on the object (ex: calibrate...) |
| Area | Text | Area of the object (ex: PP line...) |
| Answer | Memo | Answer to the question |
| PicturePath | Text | Path of picture related to the answer (in server) |
| Picture | Text | Picture name |

FIG. 13

| Field Name | Data Type | Description |
|---|---|---|
| Area | Text | Area of the object (ex: PP line...) |
| TypeOfQuestion | Text | Ex: How long, How fast... |
| ObjectKey | Text | Object to be asked (ex: sonic sensor...) |
| Parameter | Text | Parameter of the object |
| Answer | Memo | Answer to the question |

FIG. 14

| Field Name | Data Type | Description |
| --- | --- | --- |
| Goal_Id | Number | Goal ID |
| Rule_Id | Number | Rule ID |
| Premise_1 | Text | Premise No.1: question 1 in every rule |
| Premise_1_Key | Text | Key word in Premise 1 |
| Premise_1_Option | Text | Options for user to select in Premise 1 |
| Premise_1_Answer | Text | Answer for Premise 1 in Inference Engine |
| Premise_1_Why | Text | Reason of asking Premise 1 |
| Premise_Link | Text | Link between 2 premise (ex: and , or ..) |
| Premise_2 | Text | Premise No.2: question 1 in every rule |
| Premise_2_Key | Text | Key word in Premise 2 |
| Premise_2_Option | Text | Options for user to select in Premise 2 |
| Premise_2_Answer | Text | Answer for Premise 2 in Inference Engine |
| Premise_2_Why | Text | Reason of asking Premise 2 |
| Consequent | Memo | Solution for rule respectively |
| Consequent_Type | Text | Type of consequence (ex: "ra" or "r") |
| Consequent_CF | Double | Consequents' Confidential factor |

FIG. 15

| Field Name | Data Type | Description |
| --- | --- | --- |
| WorkKey | Text | Key word of the premise |
| Goal_Id | Number | Goal ID |
| Rule_Id | Number | Rule ID |
| Probe_Variable | Text | |
| User_Answer | Text | |

FIG. 16

| Field Name | Data Type | Description |
| --- | --- | --- |
| Goal_Id | Number | Goal Id (ex: 1, 2...) |
| Goal_Desc | Text | Goal description, key word of a goal (ex: Why Bv1 low yield...) |
| Goal_Question | Text | Ex: Why is BV1 low yield? |
| Goal_Area | Text | |

FIG. 17

| Field Name | Data Type | Description |
|---|---|---|
| Type | Text | Type of word to be converted (General, Machine...) |
| KeyWord | Text | Word before converted |
| WordConversion | Text | Word after converted |

FIG. 18

| Field Name | Data Type | Description |
|---|---|---|
| Type | Number | This number to define the type of word to be removed (ex: 1 for words which stand at the beginning or end of the question. 2 for words which embraced by space. |
| WordToRemove | Text | Word to be removed |

FIG. 19

| SearchSolution.aspx (Ask ERNIES) | |
|---|---|
| Overview | |
| - SearchSolution.aspx (Ask ERNIES) is a page where users can enter the questions.<br>- The coding behind will interpret the questions entered and classify the types of questions whether it's knowledge-based question or expert-consultation question.<br>- Depend on what type of questions, ERNIES will lead users to different direction.<br> • Knowledge-based: provide solution to users.<br> • Expert-Consultation: start interpreting the scenario using inference Engine.<br> • Others: searching whether the object entered by users is found in database. | |
| Interface components | |
| 1. Textbox Name (txtName) | Web component |
| 2. Textbox EmployeeID (txtEmployeeID) | Web component |
| 3. Textbox Question (txtQuestion) | Web component |
| 4. Button "Submit" (btnSubmit) | Web component |
| 5. Button "Clear" (btnClear) | Web component |
| Code behind | |
| 1. btSubmit_Click | Private Sub |
| - Remove redundant words in the question string.<br>- Replace common words in the question string.<br>- Get the Session State for variables (Name, EmployeeID, Initial Question, Interpreted question).<br> - Classify type of questions<br> • Knowledge-based (What, Where, How many, How to...): redirect to "solutions.aspx" in order to provide solution to users.<br> • Expert Consultation (Why): Perform function "GetGoal" (See below)<br> • Questions not defined: redirect to "questionType.aspx" to define whether there is any available question related to object entered by users. | |
| 2. btClear_Click | Private Sub |
| - To clear text in the following textboxes: txtName, txtEmployeeID, txtQuestion. | |
| 3. GetGoal | Public Function |
| - This function is called when users enter "Why" questions.<br>- Connect to "expertSystem.mdb", open table Goal_tbl, check whether a question entered by users is found.<br>- If question is matched with one of the Goal description:<br> • Get GoalId from table Goal_tbl<br> • Set RuleID = 1 and PremiseID = 1<br> • Get Session State for variables : GoalID, RuleID, PremiseID, Consequent (empty), ConsequentType ("ra"), KeyObjList (empty)<br> • Call function RuleCnt (See item 4)<br> • Redirect to "inferenceEngine.aspx"<br>- If question is not matched any of the Goal description:<br> • Go to "message.aspx" and display message "Please check your question or send us your feedback" | |
| 4. RuleCnt | Public Function |
| - To get the max number of RuleID with the given GoalID in table Rule_tbl.<br>- To get the max number of "ra" RuleID with the given GoalID in table Rule_tbl.<br>- Get Session State for these 2 values. | |
| 5. Page_Load | Private Sub |
| - Call function DelWorkTbl() to delete the Work_tbl everytime the page is loaded. (See item 6) | |
| 6. DelWorkTbl | Public Function |
| - Execute the data deletion in table "Work_tbl" | |

FIG. 20

| solutions.aspx | |
|---|---|
| Overview | |
| - "solutions.aspx" is a site where ERNIES displays the solution to users. | |
| Interface components | |
| 1. Label UserName (lblUserName1) | Web component |
| 2. Label EmployeeID (lblEmployeeID1) | Web component |
| 3. Label Question (lblQuestion1) | Web component |
| 4. TextArea Solution (textSolution1) | Web component |
| 5. Button "Print Solution" (btnPrint) | Web component |
| 6. Image Solution Picture (imgSolPic) | Web component |
| 7. Drop down picture list (ddPictureList) | Web component |
| 8. Button to Show picture (btnShow) | Web component |
| Code behind | |
| 1. Page_Load | Private Sub |
| - Declare variables<br>- Get Session State (Name, EmployeeID, Question, QuestionType, Original question)<br>- Interpret the question<br>  • split the question<br>  • If "Why" question, get strRecommend from Session("Consequent").<br>  The Session("Consequent") is the result ERNIES retrieves after going through the inference Engine.<br>  • If other types of question such as "What" "Where" "How To" "How many", connect to database, get the answer and assign it to strRecommend.<br>- Display the detail of the user, the question, the answer and the picture (if there is) to the users:<br>  • Username   : lblUserName1<br>  • Employee ID: lblEmployeeID1<br>  • Question   : lblQuestion1<br>  • Answer     : textSolution1.text = strRecommend<br>  • Picture    : ImgSolPic.ImageUrl = strPicPath | |
| 2. btnShow_Click | Private Sub |
| - Get name of picture that user select to view.<br>- Get path of the picture.<br>- Get the Session State of the picture path. | |
| 3. NullHelper | Public Function |
| - This is to prevent the error from any empty string in the database. | |

FIG. 21

| questionType.aspx ||
|---|---|
| Overview ||
| - This page is triggered after users enter any object (not a question) into "SearchSolution.aspx". <br> - "questionType.aspx" will search whether this object is found in database. <br> - If there is, ERNIES will ask users what type of questions they wish to know about the object. ||
| Interface components ||
| 1. Label lblQuestionType(lblQuestionType) | Web component |
| 2. List of questions (lstQuestType) | Web component |
| 3. Button Submit (btnSubmit) | Web component |
| Code behind ||
| 1. Page_Load | Private Sub |
| - Declare variables <br> - Interpret the object submitted by user <br>   ▪ Search from "WhatIs" table: if object is found, add "What is + strObject?" to the listQuestions <br>   ▪ Search from "WhereIs" table: if object is found, add "Where is + strObject?" to the listQuestions <br>   ▪ Search from "HowTo" table: if object is found, add "How to + strAction + strObject ?" to the listQuestions <br>   ▪ Search from "HowMany" table: if object is found, add "How many + strObject + are there?" to the listQuestions <br>   ▪ Search from "Goal_desc" table: if object is found, add "Why" question to the listQuestions <br><br> - intTemp is a temp variable. <br>   ▪ intTemp = 1 when Object is found in database. <br>   ▪ intTemp = 0 when no object is found. <br><br> - Display the questions to user: <br>   ▪ intTemp = 1 : display question(s) on *"questionType.aspx"* <br>   ▪ intTemp = 0 : redirect to *"message.aspx"* and display "Please check your question or send us your feedback. Thanks." ||
| 2. btnSubmit_Click | Private Sub |
| - Get the question string (strQuestion) <br> - Perform the same procedure as in *"SearchSolution.aspx"* ||

FIG. 22

| inferenceEngine.aspx | |
|---|---|
| Overview | |
| - Triggered after the "searchSolution.aspx" <br> • User enter "Why" question <br> • Searching the related GoalID <br> • Redirect to inferenceEngine.aspx <br> - Process <br> • Searching from Rule_tbl with the GoalID retrieved from "searchSolution.aspx". <br> • Get Premise questions for each RuleID with the given GoalID. <br> • Display Premise and selection to users. <br> • Get selection from user and compare it to the correct answer. <br> • Get the Consequent and redirect to *"solutions.aspx"* if answer from user is same as answer from the Premise. <br> • Proceed to next RuleID if the answer is not correct. Repeat the same procedure in *"inferenceEngine.aspx"*. | |
| Interface components | |
| 1. Label Rule Description (lblRule_desc) | Web component |
| 2. Radio button Selection (lstSelection) | Web component |
| 3. Button Next (btnNext) | Web component |
| 4. Button Go Back (btnGoBack) | Web component |
| Code behind | |
| 1. Page_Load | Private Sub |
| - The *"inferenceEngine.aspx"* page always load question and selection from the inference Engine. <br> - Perform the following sequence until the Consequence (solution) is retrieved: <br> • Get Goal_ID, Rule_ID, Premise_ID, Consequence Type <br> • Call GetRules based on the above values <br> • The Premise and the selection after the sequence in GetRules <br> • If there is still Rule found, display Premise and selection to the users in *"inferenceEngine.aspx"*. <br> • If there is no Rule found, no relative Consequent found, proceed to *"solutions.aspx"* and display *"There is temporarily no recommendation for your case. Please send us some feedback."* | |
| 2. GetRules | Public Function |
| Description: Premise descriptions will be retrieved in this Function <br> Sequence: <br>     - Declare variables <br>     - Retrieve Premises for "ra" Type <br>      > For Premise 1: <br>       • If Premise had not been asked before: Get related data from Premise 1 | |

FIG. 23A

- If Premise had been asked before:
  Call CheckUserAns() and set GetRules_tempflag = 1
> For Premise 2:
  - If Premise had not been asked before: Get related data from Premise 2
  - If Premise had been asked before:
    Call CheckUserAns() and set GetRules_tempflag = 2

- Retrieve Premises for "r" Type
> For Premise 1:
  - If Premise had not been asked before: Get related data from Premise 1
  - If Premise had been asked before:
    Call CheckUserAns() and set GetRules_tempflag = 3
> For Premise 2:
  - If Premise had not been asked before: Get related data from Premise 2
  - If Premise had been asked before:
    Call CheckUserAns() and set GetRules_tempflag = 4

- Get Session States

- Interpret the *GetRules_tempflag*
  > Definition: The GetRules_tempflag is used to define whether the Premise can be skipped if it has been asked before.
  > GetRules_tempflag = 1
    - if PremiseLink = "and" or "or" : Move to the next Premise
    - if PremiseLink = "-"
  > GetRules_tempflag = 2
    - Move to the next "ra" Rule > GetRules_tempflag = 3
    - Move to the next Premise of the same "r" rule > GetRules_tempflag = 4
    - Move to the next "ra" Rule

| 3. btnNext_Click | Public Sub |
|---|---|
| - Declare variables<br>- Get selection from user<br>- Create a work key string (StrWorkKey0)<br>- Save data into Work_tbl<br>- Call EvaluateGoal()<br>- Get results after the EvaluateGoal()<br>- If Consequent is found, redirect to "solutions.aspx"<br>- If Consequent is not found, continue searching in inference Engine | |

| 4. EvaluateGoal | Public Function |
|---|---|
| Overview: to evaluate the selection done by users<br>Process:<br>  - For "ra" Rules, PremiseLink = "-":<br>    • If User answer = Premise answer: set<br>      int_EvaluateGoal = 3 | |

FIG. 23B

- If User answer = "Not sure": set int_EvaluateGoal = 0
- Else set int_EvaluateGoal = 1

- For "ra" Rules, PremiseLink = "and":
  - If User answer = "Not sure": set int_EvaluateGoal = 0
  - If User answer <> Premise answer:
    . If PremiseID = 1: set int_EvaluateGoal = 0 and Session("tempflag") = 1
    . If PremiseID = 2: set int_EvaluateGoal = 1

- If User answer = Premise answer:
    . If PremiseID = 1: set int_EvaluateGoal = 2 and Session("tempflag") = 1
    . If PremiseID = 2 and Session("tempflag") = 1: set int_EvaluateGoal = 3
    . If PremiseID = 2 and Session("tempflag") = 1: set int_EvaluateGoal = 1

- For "ra" Rules, PremiseLink = "and":
  - If User answer = "Not sure": set int_EvaluateGoal = 0
  - If User answer <> Premise Answer
    . If PremiseID = 1: set int_EvaluateGoal = 2
    . If PremiseID = 1: set int_EvaluateGoal = 1
  - If User answer = Premise Answer: set int_EvaluateGoal = 3

- For "r" Rules, PremiseLink = "and":
  - If User answer <> Premise Answer: set int_EvaluateGoal = 1
  - If User answer = Premise Answer: set int_EvaluateGoal = 3

- For "r" Rules, PremiseLink = "and":
  - If User answer <> Premise Answer
    . If Premise = 1: set int_EvaluateGoal = 2, Session("tempflag") = 0
    . If Premise = 2: set int_EvaluateGoal = 1
  - If User answer = Premise Answer:
    . If PremiseID = 1: set int_EvaluateGoal = 2 and Session("tempflag") = 1
    . If PremiseID = 2 and Session("tempflag") = 1: set int_EvaluateGoal = 3
    . If PremiseID = 2 and Session("tempflag") = 0: set int_EvaluateGoal = 1

- For "r" Rules, PremiseLink = "or":
  - If User answer = Premise Answer: set int_EvaluateGoal = 3
  - If User answer <> Premise Answer:
    . If PremiseID = 1: set int_EvaluateGoal = 2
    . If PremiseID = 2: set int_EvaluateGoal = 1

- After Evaluate the selection, Get the value of int_EvaluateGoal
- Call interpretResult(int_EvaluateGoal)

| 5. InterpretResult | Public Sub |
|---|---|

- If int_EvaluateGoal = 0: move to related "r" rule
  - Call function GetR_Rule based on Premise Link, Premise Key, GoalID, Premise ID

FIG. 23C

- If int_EvaluateGoal = 1:
  * For "ra" rules: move to the next "ra" rule
  * For "r" rules: move to the next "ra" rule
- If int_EvaluateGoal = 2: move to the next Premise in the same rule
- If int_EvaluateGoal = 3: get and display Consequence
  * Call function GetConsequence
  * Get Session("Consequent")

| 6. GetConsequence | Public Function |
|---|---|
| - This function needs 3 inputs: GoalID, RuleID, and Consequent Type.<br>- Connect to database, open Rule_tbl<br>> For "ra" type: Get Consequent<br>> For "r" type:<br>  * Get Consequent, Consequent CF<br>  * Set tempflag = 1<br>- tempflag : ERNIES will get the Consequent of to the previously<br>       related "ra" ruleID when this flag is set to 1. | |

| 7. GetR_Rule | Public Function |
|---|---|
| - Get "r" rule information based on Premise Link, KeyWord, and Goal ID<br>- Connect to database, open Rule_tbl, select all information belonging to "r" rule<br>- Check if the keyword from previously related "ra" rule is found in "r" rule Consequent.<br>- Get "r" RuleID if keyword is found in the "r" Consequent.<br>- Move to the next "ra" if there the keyword is not found.<br>- cntR_Rule: this flag is set to define whether there is any "r" rule<br>       with the given GoalID. If there is no "r" Rule, ERNIES<br>       will proceed to next Premise or next "ra" Rules. | |

| 8. CheckUserAns | Public Function |
|---|---|
| - This function is to check the user selection against the Work_tbl in database. | |

| 9. DelWorkTbl | Public Function |
|---|---|
| - This function is to delete all the record in the Work_tbl. | |

| 10. btnGoBack_Click | Private Sub |
|---|---|
| - This function is to allow user to go back to the beginning RuleID of the given GoalID.<br>- Call DelWorkTbl when the button is fired. | |

| 11. NullHelper | Public Function |
|---|---|
| - This is to prevent the error from any empty string in the database. | |

FIG. 23D

ENGINEERING EXPERT SYSTEM

This application claims benefit under 35 USC §119 of Singapore patent application No. 200704647.7 filed Jun. 21, 2007, the contents of which are incorporated herein by reference.

The present invention relates generally to expert systems and, more specifically, to an expert system and inquiry kiosk for use by engineering personnel in a manufacturing or other industrial environment.

In the course of designing and troubleshooting manufacturing and other industrial systems, machines, and processes, engineers and engineering technicians often need to acquire information from sources such as manuals and experienced colleagues. However, at the time an engineer or technician seeks to consult with an experienced colleague, such a person may not be available. For example, in a manufacturing plant that operates several shifts per day (potentially 24 hours), an engineer who discovers that the yield of a particular process is lower than expected may need to seek information at any time of the day or night to attempt to solve the problem. Persons with the most relevant knowledge may not be available at all times. It would be desirable to enable the engineer to access such knowledge at all times. It would also be desirable for the knowledge that is made available to the engineer to be consistent, rather than for the engineer to obtain different and possibly inconsistent answers from various sources.

Also, in such environments, the same problems or same types of problems tend to arise from time to time. Similarly, an engineer assigned to a particular process or system tends to seek the same information in solving problems relating to that process or system as engineers who have previously been assigned such tasks. Often, an engineer simply needs to know the function of a particular item or know what item performs a particular function and where it is located in the system. It would be invaluable to the engineer to acquire the knowledge of those who are most familiar with the system or who have done the same type of work before.

While written manuals can be of help to engineers, they generally cannot be updated readily to reflect newly learned knowledge. Rather, a technical writer typically needs to integrate the new information into the manual, and the revised manual needs to be made available. Even in the age of electronic documentation and company-wide intranets, such a process can be slow and inefficient.

It would be desirable to provide a system for quickly, conveniently and consistently responding to requests for information from engineers and similar persons in a manufacturing or other industrial environment. The present invention addresses these problems and deficiencies and others in the manner described below.

SUMMARY OF THE INVENTION

The present invention relates to an expert system for aiding engineers, technicians or other engineering personnel working in a manufacturing or other industrial environment. In an exemplary embodiment of the invention, users can interact with the system using kiosks in the relevant areas of the plant to enter queries and receive answers.

The system includes a user interface for receiving queries from the users and outputting solutions or other responses to the queries. The queries can relate to elements of the company's industrial environment with which the user works, such as elements of machines, processes and systems. A user can enter a query in a natural language format, which the system parses for keywords or keyterms. For example, in the exemplary embodiment, a user can enter a query such as: "How many screws are there on the bottom of the Molding Machine?" Another example could be: "Why is the yield of the Molding Machine low?" The first question is an example of what is referred to herein as a "knowledge-based" query because it includes the description-oriented keyterm "how many." Other knowledge-based query keyterms include, for example: "what is"; "what are"; "where is"; "where are"; "how many"; "how long"; "how to"; "how do I"; "tell about"; and "describe". The second query is an example of what is referred to herein as an "expert consultation-based" query because it includes the reasoning-oriented keyterm "why." The system compares keyterms in the query with keyterms in a database to determine if any matches exist.

In the exemplary embodiment of the invention, entry of a query that the system determines to be knowledge-based causes the system to use the keyterms to search the database for an associated solution or answer. For example, the answer associated with the combination of keywords "how many," "screws," "bottom," and "molding machine" may comprise the number of screws on the bottom of the molding machine, a paragraph of text describing that portion of the machine, a picture of that portion of the machine, etc. The database can contain information that is specific to the company's machines, processes, systems, etc. In an exemplary embodiment that has been developed by the assignee of this invention and patent application, the database contains information specific to the company's contact lens manufacturing plant. The embodiment is referred to as the Engineering Resource .NET Interactive Expert System ("ERNIES"). Nevertheless, the invention can be used in any suitable industry.

Entry of a query that the system determines to be expert consultation-based causes the system to use the keyterms to search the database for an associated goal. A "goal," as the term is used in the context of an expert system using backward chaining, refers to an end result from which the system works backwards, i.e., upwards in a logic tree, seeking facts that support the goal. In the exemplary embodiment, the system searches the database for a goal by matching keyterms. For example, a goal can be associated with the combination of keyterms "why," "Molding Machine," "yield" and "low." Upon finding a goal, the system obtains and outputs one or more further questions associated with the goal and prompts the user to answer them. The goal can be associated with one or more rules, each comprising a combination of one or more further questions. If the user's answers match those which the database indicates are the answers to a combination of one or more premises that satisfies the rule, then the system indicates the rule is satisfied and outputs associated solution information via the user interface.

The system can include a feedback subsystem for updating the database in response to receiving feedback information from users. Users can provide feedback via the user interface or other means. By updating the database in response to feedback, the expert system can be expanded with additional knowledge acquired from users.

BRIEF DESCRIPTION OF THE DRAWINGS

FIG. 5 illustrates an exemplary user interface screen for inputting a query.

FIG. 6 illustrates an exemplary user interface screen for outputting a group of possible queries from which a user can choose.

FIG. 7 illustrates an exemplary user interface screen for outputting an answer.

FIG. 8 illustrates another exemplary user interface screen for outputting an answer.

FIG. 9 illustrates an exemplary user interface screen for asking the user to answer a further question associated with an expert system rule.

FIG. 11 illustrates a "What_is" database table in the exemplary embodiment.

FIG. 12 illustrates a "Where_is" database table in the exemplary embodiment.

FIG. 13 illustrates a "How_To" database table in the exemplary embodiment.

FIG. 14 illustrates a "How_Many" database table in the exemplary embodiment.

FIG. 15 illustrates a "Rules" database table in the exemplary embodiment.

FIG. 16 illustrates a "Work" database table in the exemplary embodiment.

FIG. 17 illustrates a "Goals" database table in the exemplary embodiment.

FIG. 18 illustrates a "Word_Conversion" database table in the exemplary embodiment.

FIG. 19 illustrates a "Word_Removal" database table in the exemplary embodiment.

FIG. 20 is a table showing "SearchSolution.aspx" active server page .NET (ASPX) structure and pseudocode for inputting a query in the exemplary embodiment.

FIG. 21 is a table showing "solutions.aspx" active server page .NET (ASPX) structure and pseudocode for outputting a solution the query in the exemplary embodiment.

FIG. 22 is a table showing "questionType.aspx" active server page .NET (ASPX) structure and pseudocode for outputting a list of possible queries in the exemplary embodiment.

FIG. 23A is a table showing "inferenceEngine.aspx" active server page .NET (ASPX) structure and pseudocode for processing a query in the exemplary embodiment.

FIG. 23B is a continuation of FIG. 23A.

FIG. 23C is a continuation of FIG. 23B.

FIG. 23D is a continuation of FIG. 23C.

DETAILED DESCRIPTION

Figure 1:
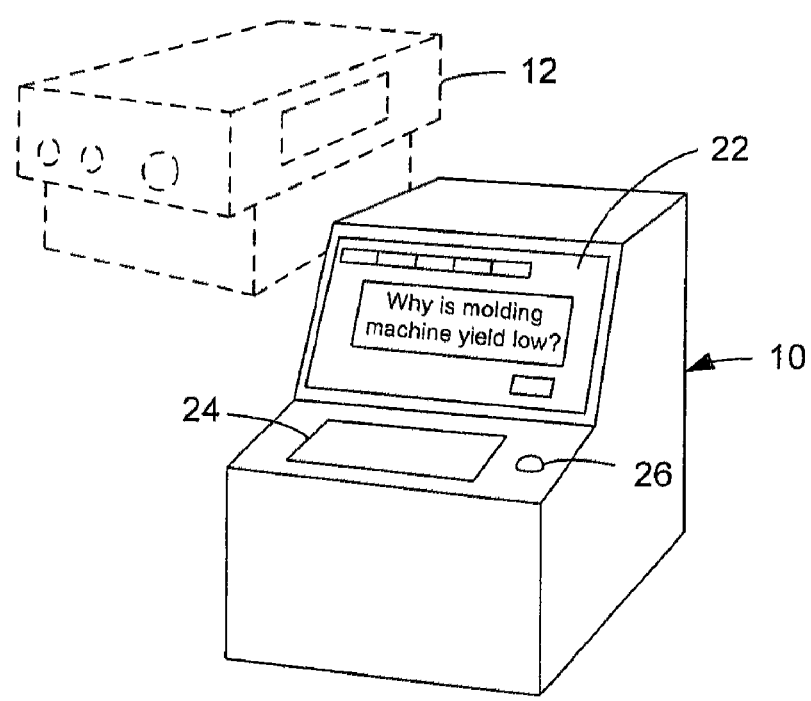
FIG. 1 illustrates an expert system for aiding engineers or similar users in an industrial environment, in accordance with an exemplary embodiment of the invention.
Figure 2:
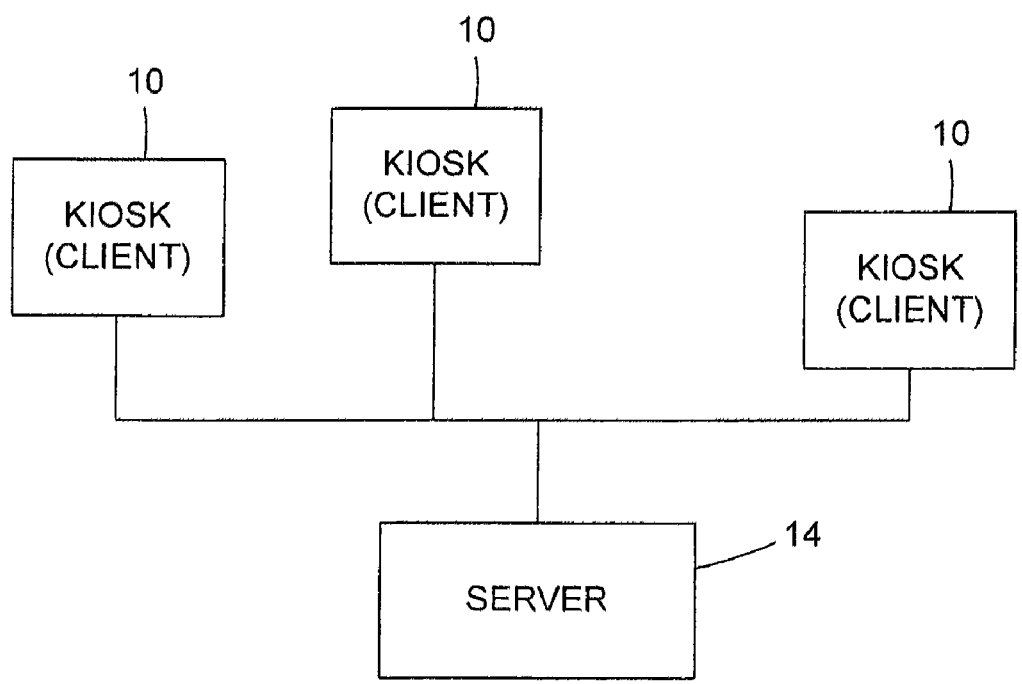
FIG. 2 illustrates a client-server system in which kiosks are used to interact with the expert system, in accordance with the exemplary embodiment of the invention shown in FIG. 1.

As illustrated in FIGS. 1-2, in an exemplary embodiment of the invention one or more electronic kiosks 10 are disposed in a manufacturing area (in colloquial terms, "on the shop floor") of a plant or similar industrial environment operated by a company or other business enterprise. The company's engineers, engineering technicians or others who work in the environment in an engineering-related capacity can interact with a kiosk 10 to ask questions regarding an element of the environment, such as a machine 12, process, system or portion thereof. Kiosks 10 (acting as client computers) communicate with a central server (computer) 14 via a local area network 15 (e.g., a company-wide intranet). As described below in further detail, server 14 processes each query that a user enters on kiosk 10 and transmits a response back to kiosk 10.

Figure 3:
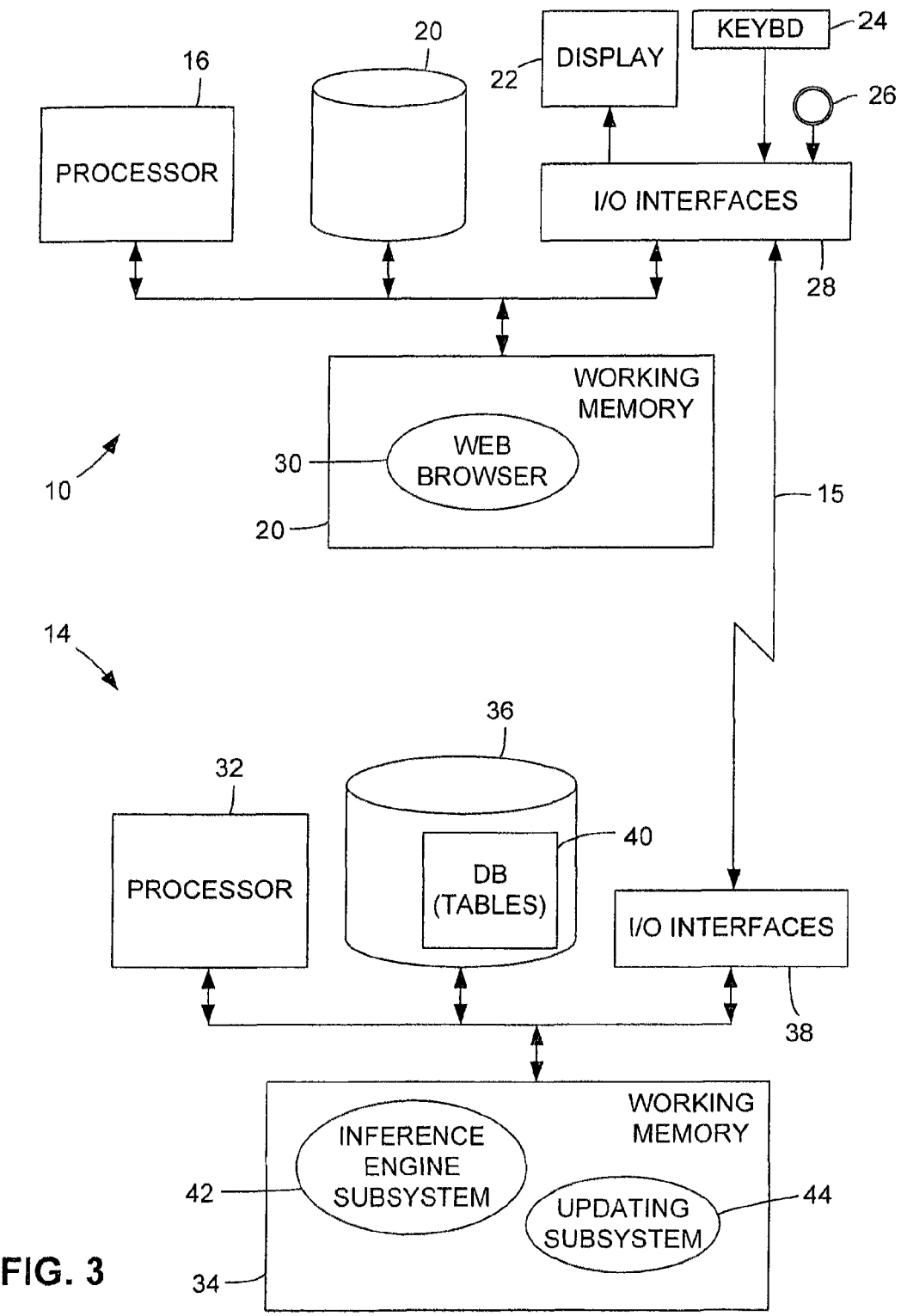
FIG. 3 is a block diagram of the programmed client-server system in the exemplary embodiment.

As illustrated in FIG. 3, kiosk 10 includes elements characteristic of a conventional client computer: a processor 16, memory 18, hard disk or similar data storage device 20, display 22, keyboard 24, trackball 26 or similar pointing device for a graphical user interface, and input/output (I/O) interface hardware 28 through which the user interface and network interface elements are interfaced with the other elements and with network 15 (e.g., via a network interface card). In addition, the software elements of kiosk 10 include a web browser (software) 30. Other hardware and software elements typical of a conventional client computer, such as an operating system and utilities, are also included but not shown for purposes of clarity. Web browser 30 is shown for purposes of illustration as conceptually residing in memory 18, but persons skilled in the art to which the invention relates can appreciate that such software elements need not actually reside in their entireties or at all times in memory but rather can be retrieved in whole or part from sources such as data storage device 20 on an as-needed basis in accordance with well-understood principles of computer operation.

Similarly, server 14 includes elements characteristic of a server computer: a processor 32, memory 34, hard disk or similar data storage device 36, and various I/O interfaces 38. In addition, as described below in further detail below, software elements of server 14 include a database 40, and an inference engine subsystem 42 for receiving user queries and obtaining solution information from database 40. The software elements further include an updating subsystem 44 for updating the database in response to feedback information received from users. Although not separately shown in FIG. 3 for purposes of clarity, inference engine subsystem 42 includes an inference engine portion and a user interface portion, and updating subsystem 44 includes a user feedback portion through which information is received from users and an administrator portion that aids system administrators in updating database 40 and performing other administrative tasks. As such feedback and administrative functions are relatively well understood in the art, they are not described herein in as great detail as inference engine subsystem 42. Other hardware and software elements typical of a conventional server computer, such as an operating system and utilities, are also included but not shown for purposes of clarity. Inference engine subsystem 42 and updating subsystem 44 are shown for purposes of illustration as conceptually residing in memory 34, but persons skilled in the art to which the invention relates can appreciate that such software elements need not actually reside in their entireties or at all times in memory but rather can be retrieved in whole or part from sources such as data storage device 36 on an as-needed basis in accordance with well-understood principles of computer operation. Also, the manner in which inference engine subsystem 42 and updating subsystem 44 are shown in FIG. 3 is intended to be for purposes of facilitating a summary or high-level explanation of the invention (as well as illustrating that it can be embodied as a "computer program product") and not to convey actual software code structure. Exemplary code structure is, however, described below with regard to FIGS. 20-23.

In an exemplary embodiment that has been developed by the assignee of this invention and patent application, database 40 contains information specific to the company's contact lens manufacturing environment, including lists of questions pertaining to that environment and answers to those questions. Nevertheless, the invention can be used in any other suitable industry. Although the software elements can be embodied in any suitable manner, a collection of active server pages (ASP) created within the MICROSOFT .NET framework (using, for example, a software development tool such as MICROSOFT VISUAL STUDIO) has been found to work well in the exemplary embodiment. The embodiment is referred to as the Engineering Resource .NET Interactive Expert System ("ERNIES"), which is reflected on some of the screen displays in the drawing figures described below.

Figure 4A:
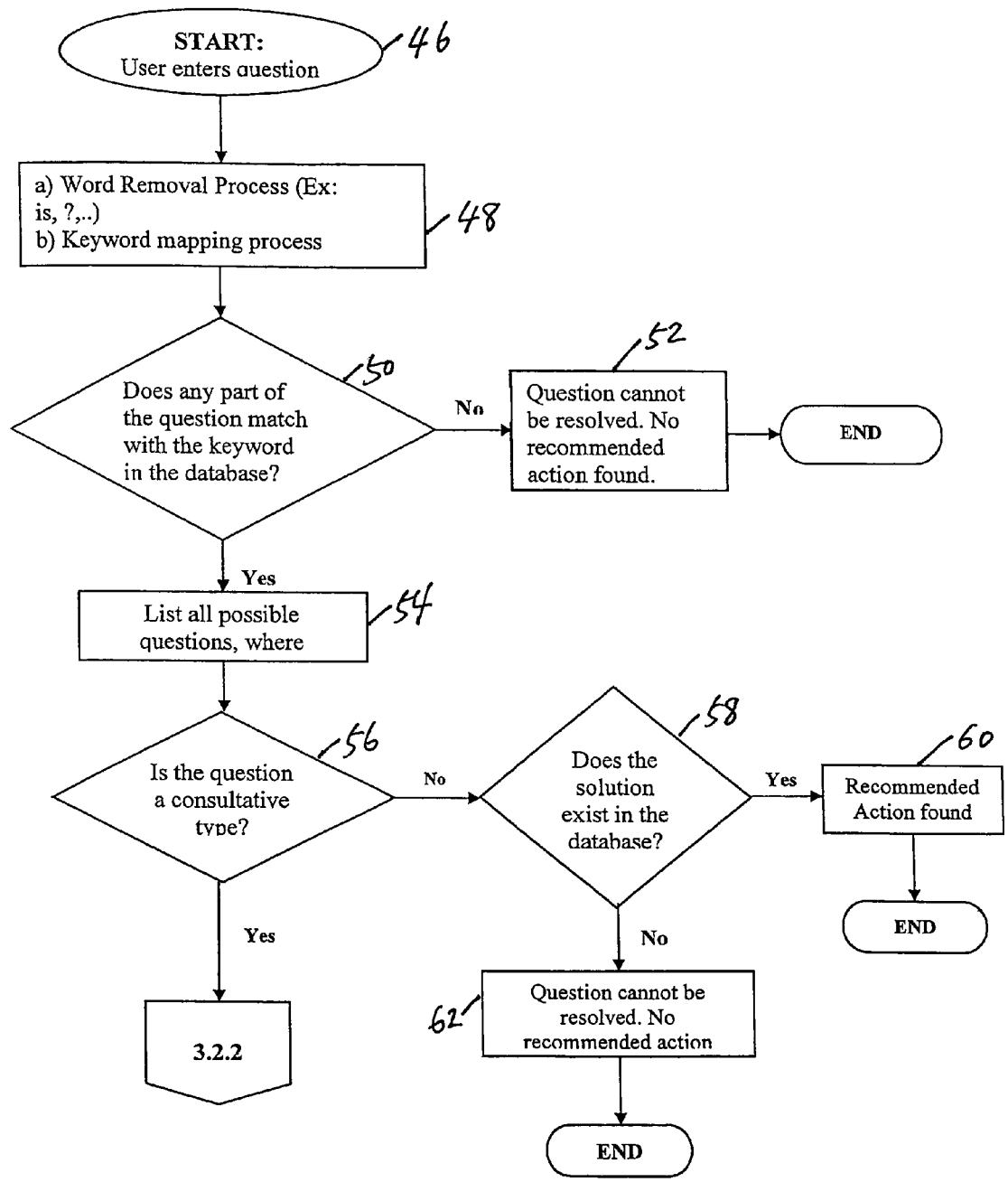
FIG. 4A is a flow diagram illustrating a method of operation of the system in the exemplary embodiment.
Figure 4B:
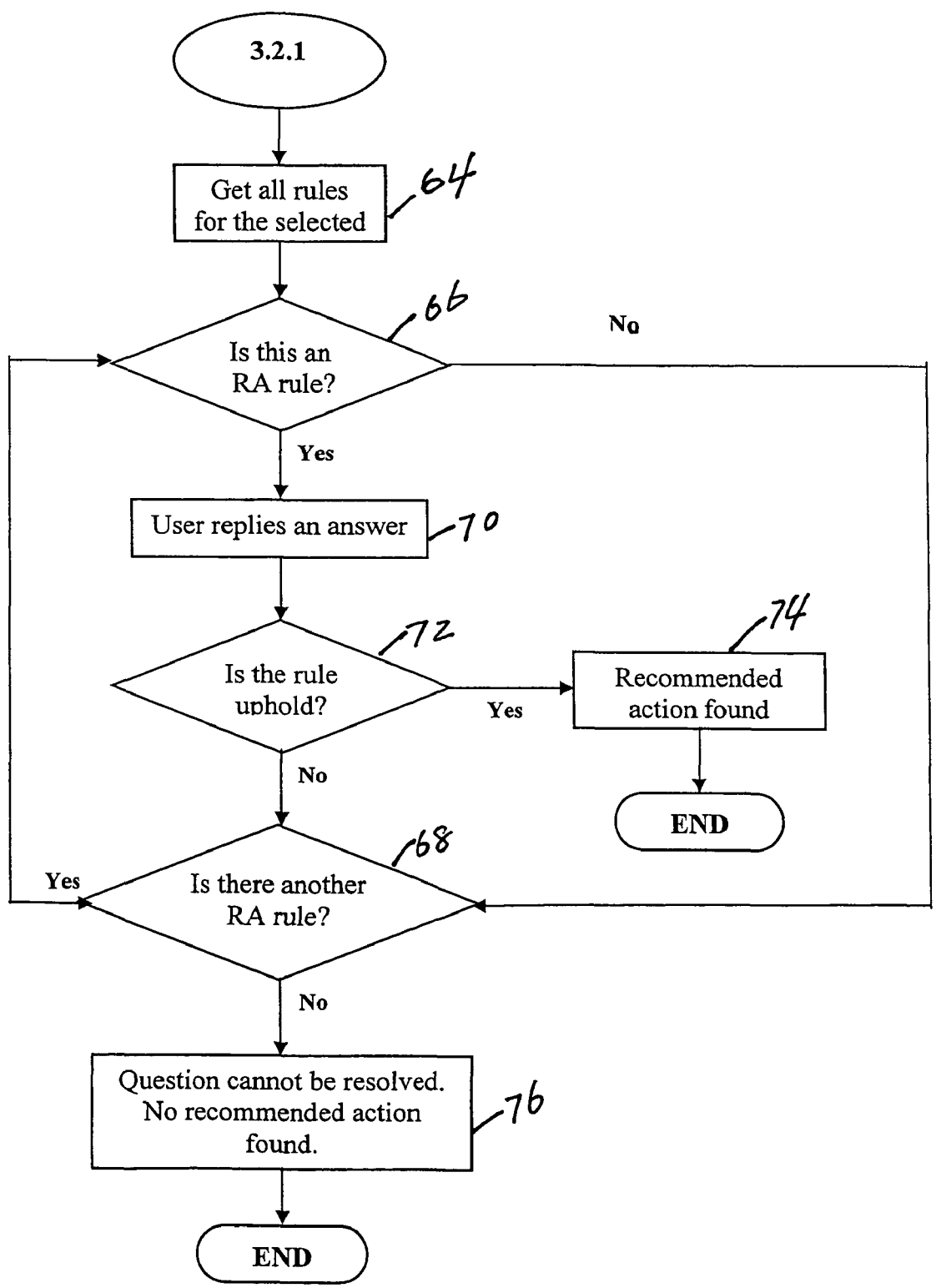
FIG. 4B is a continuation of the flow diagram of FIG. 4A.

The flow diagram of FIGS. 4A-B provide an overview of the operation of the system. At step 46, the system provides a screen display (i.e., a web form), illustrated in FIG. 5, into which a user enters a query (question). An example of a query might be: "Why is BV1 low yield?" (where "BV1" is a term for a camera system in one of the plant's contact lens manufacturing machines).

As indicated by step 48, the system performs two functions: removal of words that are deemed not useful to the search for a solution using keyterms (i.e., a combination of one or more keywords); and mapping of terms that are synonymous with keyterms in the database that may be useful to the search for a solution. For example, the system can remove punctuation marks, articles such as "the," and verbs such as "is." Also, for example, the system can substitute a keyterm such as "what [is]" for synonymous words that a user may use, such as "describe."

As indicated by step 50, the system determines whether any of the keyterms remaining in the query following step 48 match keyterms in database 40. If not, then at step 52 a suitable action is taken in response to the system's inability to determine a solution to the query, such as displaying a page (not shown) that indicates such to the user. If the system matches one or more terms in the query with keyterms in database 40, then at step 54 it lists all questions contained in database 40 that include those keyterms. An example of a screen display showing a list of possible questions is shown in FIG. 6. The screen includes checkboxes next to the questions, which the user can check to select one of the questions that the user deems most similar to what the user is attempting to ask.

As indicated by step 56, the system searches for a solution to the query in a manner that depends upon whether the query calls for a "knowledge-based solution" or an "expert consultation-based solution." The system attempts to match terms in the query with keyterms in database 40. For example, the presence of description-oriented keyterms, such as "what is", "what are", "where is", "where are", "how many", "how long", "how to", "how do I", "tell me about", and "describe" signals that the query calls for a knowledge-based solution. A knowledge-based solution can include, for example, a straightforward description of what something is or how to do something. Other examples of queries that call for a knowledge-based solution in the exemplary embodiment might include, "What is the linear table?" and "How do I calibrate the sonic sensor?"

If the query calls for a knowledge-based solution and, as indicated by step 58, a solution is found in the tables of database 40 (by matching keywords), then at step 60 the system displays a page that sets forth text, images or other information that is retrieved from the database tables. An exemplary page that sets forth an answer to the query, "What is the linear table?" is shown in FIG. 7. An exemplary page that sets forth an answer to the query, "[Tell me] how to calibrate the sonic sensor?," is shown in FIG. 8. If no solution can be found to the query, the system outputs an appropriate page (not shown for purposes of clarity) to alert the user, as indicated by step 62.

The presence of reasoning-oriented keyterms, such as "why," signals that the query calls for a expert consultation-based solution. A query that calls for an expert consultation-based solution can include, for example, why an unexpected result is being observed in an industrial process, such as an unusually low yield. The above-mentioned example is: "Why is BV1 low yield?" As described below in further detail, there is a goal table that relates to expert consultation-based solutions. Inference engine subsystem 42 uses what is known in the lexicon of expert systems as "backwards chaining." A backwards chaining inference engine begins with a goal or hypothesis and works backwards to determine if information is available that can support the goal.

An applicable goal is found by matching terms in the query to keyterms in the goal table. As indicated by step 64, once a goal has been found in the goal table, one or more corresponding rules are obtained from a rule table. Each rule comprises what are known in the lexicon of expert systems as "premises" and corresponding "consequents." In the context of the exemplary embodiment of the invention, each premise is question that prompts the user for further information that may be useful in supporting the goal. In the context of the exemplary embodiment, each consequent is either a solution to the query, i.e., a "recommended action" (RA) for the user to take, or an indication that still further information is needed from the user in order to answer the query.

As indicated by the loop between steps 66 and 68, the premises or questions corresponding to each of the RA-type rules that has been obtained from the rule table is presented to the user. An example of such a screen is shown in FIG. 9, in which the user is asked, in response to the exemplary query, "Why is BV1 low yield?," to answer the further question: "Looking at tool layout, what is the trend of low yield?" Three options for response are presented: "Position related"; "Particular tool"; and "Not sure." The user can check the corresponding checkbox to indicate a response, as indicated by step 70. The user's response may in some instances satisfy or uphold the rule. In some instances, the rule may include a second premise chained or connected to the previous response with a logical "AND" or "OR" connector. For example, if the user responds by checking the "Particular tool" box, another screen (not shown) may be presented in which the user is asked to answer the further question: "Are there more than four positions in which BV1 yield is less than 50%?" The two further questions or premises are connected by "AND" logic. If the user checks a "Yes" box (not shown), then the combination of the user's two responses may satisfy or uphold the rule, and a corresponding recommended action is displayed. If, as indicated by step 72, the rule is satisfied, then the corresponding recommended action is displayed, as indicated by step 74. For example, the recommended action can consist of text, images, etc., explaining to the user how to restore the yield to its normal range. If none of the RA-type rules for the goal is satisfied by the user's responses, the system indicates to the user that it cannot answer the query, as indicated by step 76. As this example illustrates, the goals and rules can be very specific to elements of the company's industrial environment with which the user works, such as elements of machines, processes and systems.

Figure 10:
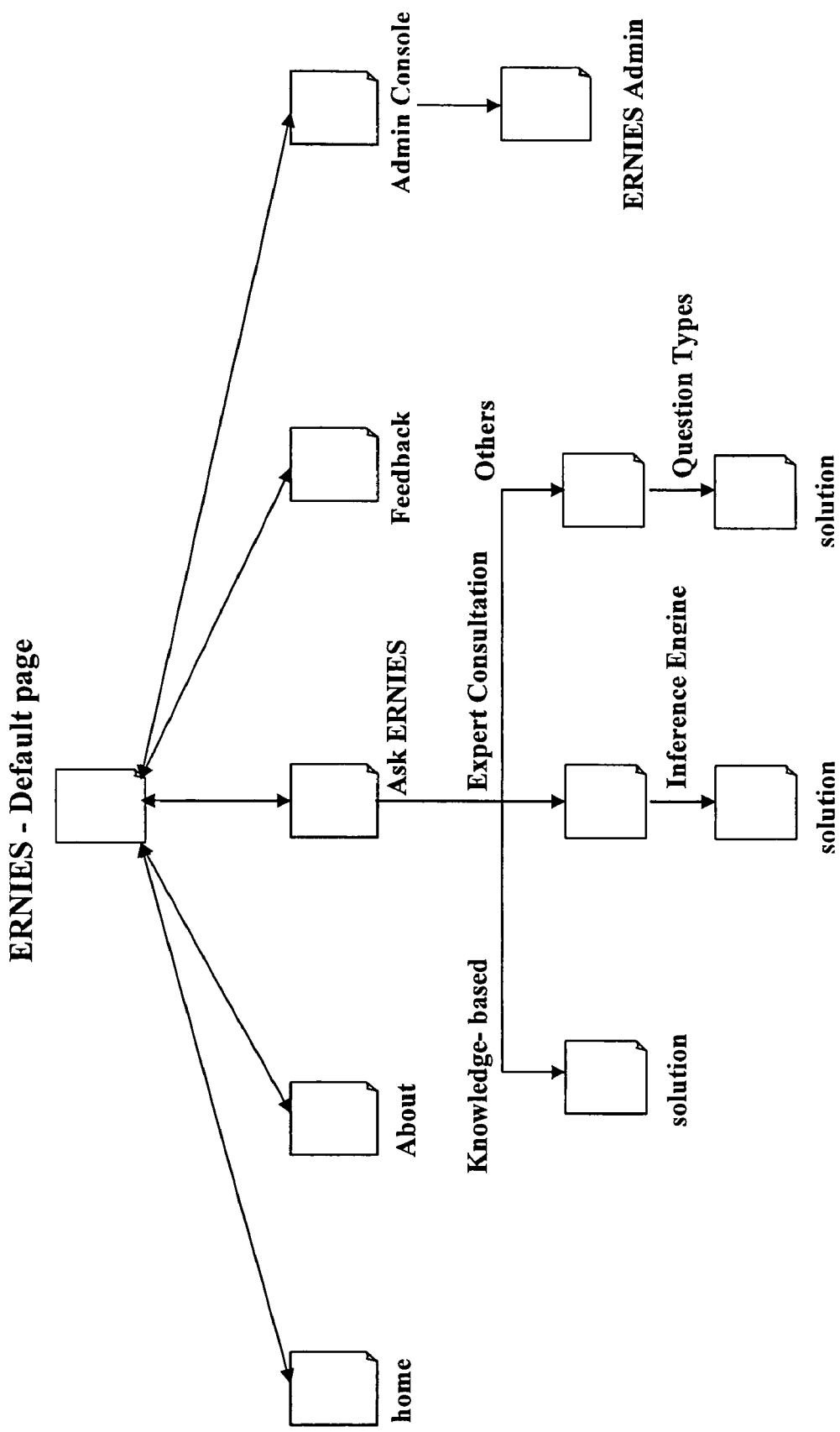
FIG. 10 illustrates a web page arrangement in the exemplary embodiment.

An exemplary structure for the software elements is shown in FIG. 10. As noted above, although the software elements can be embodied in any suitable manner, in the exemplary embodiment they comprise a group of active server pages .NET (ASPX) created with the MICROSOFT .NET framework. As the MICROSOFT .NET framework and ASPX (as well as its predecessor ASP) are well understood by persons skilled in the art to which the invention relates, these concepts are not discussed in further detail herein. However, as described in further detail below, the structure and pseudocode for such pages is illustrated in the tables of FIGS. 20-23.

Referring again to FIG. 10, a primary page, referred to as "Ask ERNIES" (or by the file name SearchSolution.aspx in FIG. 20) presents the form described above that prompts the user to enter a query. The "Ask Ernies" page calls or redirects to either a "Solution" page (file name solutions.aspx in FIG. 21) that presents a solution, or an "Inference Engine" page (file name "inferenceEngine.aspx in FIGS. 23A-D). If the user enters something that is not recognized as a valid question, the "Ask ERNIES" page calls or redirects to a "Question Types" page (file name "questionType.aspx" in FIG. 22) that causes a "Solutions" page to be presented that prompts the user to select a question from a list of possible questions. Additional pages include a "Feedback" page through which the user can submit feedback to suggest additional questions and answers to be included in database 40, and an "Admin Console" page through which a system administrator can add such questions and answers and otherwise add to, delete from, and modify the database tables. A home page ("Home") through which a user can log in to the system, and an "About" page through which a user can obtain general information about the system (e.g., software release version number, etc.), are also included.

More specifically, after the user logs in to the ERNIES expert system, the system begins with the searchSolution.aspx ("Ask ERNIES") page, the structure and pseudocode for which is shown in the table of FIG. 20. As described above, the page presents a user interface text entry box into which the user types a query. (Other embodiments of the invention can include a voice-recognition interface to replace or supplement typing.) The page uses the term conversion database table shown in FIG. 18 to replace common synonyms with a standardized term, as described above with regard to step 48 in FIG. 4. The page likewise uses the word removal database table shown in FIG. 19 to remove or delete terms that are not useful to the keyterm matching steps that follow.

The page then classifies the query as calling for either knowledge-based solution if it includes one or more description-oriented keyterms or an expert consultation-based solution if it includes one or more reasoning-oriented keyterms. The page then redirects to either the solutions.aspx page, the structure and pseudocode for which is shown in the table of FIG. 21, if a knowledge-based solution is called for, or a GetGoal function if an expert consultation-based solution is called for. If neither reasoning-oriented nor description-oriented keyterms are found in the query, it is classified as undefined or unanswerable, and the page redirects to the questionType.aspx page, the structure and pseudocode for which is shown in the table of FIG. 22.

Upon redirecting, the solutions.aspx page (FIG. 21) connects to the database, expertSystem.mdb, and searches the "What_Is" table (FIG. 11), "Where_is" table (FIG. 12), "How_To" table (FIG. 13) and "How_Many" table (FIG. 14) for keyterms matching terms in the query. As described above, "what is", "where is", "how to" and "how many" are standardized description-oriented keyterms that have substituted for any synonymous terms the user may have entered. Fields of the tables contain these keyterms as well as keyterms relating to the specific machines, processes, systems, etc., about which a user might ask for descriptions. Data in the tables for which matching fields are found is retrieved and displayed for the user. For example, the retrieved data associated with the combination of keywords "how many," "screws," "bottom," and "molding machine" may comprise the number of screws on the bottom of the molding machine, a paragraph of text describing that portion of the machine, a picture of that portion of the machine, etc.

If the query calls for an expert consultation-based solution, the GetGoal function of the searchSolution.aspx page connects to the database, expertsystem.mdb, and opens and searches the goal table (FIG. 17), for keyterms matching terms in the query. For each key field in the goal table for which a matching keyterm is found, the corresponding goal, identified by its Goal_ID, is retrieved. The page then redirects to the inferenceEngine.aspx page. If query terms do not match any keyterms in the goal table, a message.aspx page (the details of which are not shown for purposes of clarity) displays a message for the user that requests the user check the question or send feedback to the system administrator to advise of the question that ERNIES was unable to answer.

Upon redirecting, the inferenceEngine.aspx page (FIGS. 23A-D) opens the rule table (FIG. 15) of the database and, using the Goal_ID, retrieves the corresponding rules and their the corresponding premise questions, array of options or possible answers to each premise from which the user can choose, the consequents or solutions to the rules, and the "correct" answers to the premises (i.e., the answers for which there are corresponding consequents). Beginning with the first such rule, the page displays the questions for the user to answer. As described above, the user can check boxes to indicate answers to the questions. The page stores the user's answers in a work table (FIG. 16). The page then calls an EvaluateGoal function to determine if the user's answers match the "correct" premise answers for the rule. If they do, the page obtains the consequent for the rule from the rule table. If they do not, the page proceeds to the next rule that was found to correspond to the Goal_ID and repeats the above-described steps, as noted above with regard to the loop in FIG. 4B. Processing redirects to the solutions.aspx page to display any consequent or solution (i.e., answer to the user's query) found, or, if no consequents have been found, to a display message for the user that requests the user check the question or send feedback to the system administrator to advise of the question that ERNIES was unable to answer.

Although not shown for purposes of clarity, a confidence factor can be displayed along with each solution to indicate the degree of confidence that the author of the solution places upon the solution as being correct. For example, a 90% confidence factor means that the author is 90% certain that the solution solves or otherwise properly addresses the problem. Also, for each solution displayed, a form (not shown) can be provided into which the user can enter a rating (e.g., a scale of 1-5) indicating how helpful the user found the solution to be. System administrators can use this feedback to help improve the system.

By augmenting the database in response to feedback from users, the knowledge base of the expert system can be expanded over time. Although in the exemplary embodiment of the invention the means for updating the database in response to receiving feedback involves an administrator reading feedback forms submitted by users and updating the database tables in response, in other embodiments the feedback and updating process can be automated.

The invention claimed is:
1. An expert system for aiding engineering personnel in a contact lens manufacturing, comprising:
  a user interface for receiving a query from a user regarding an element of business entity's industrial environment in which the user works in a contact lens manufacturing related capacity;

a database containing information describing aspects of elements of the business entity's industrial environment;

the inference engine subsystem receives the query via the user interface and obtains solution information from the database by matching keyterms in the query, wherein the user interface outputs the solution information to the user;

an inference engine matches keyterms in the query with keyterms associated with rules to select a rule from the database; and the inference engine obtains a further question from the database associated with the selected rule;

the user interface prompts the user to answer the further question; and the inference engine determines if solution information associated with a user's answer to the further question is available in the database.

2. The expert system claimed in claim 1, further comprising a kiosk operable by the user through the user interface.

3. The expert system claimed in claim 1, wherein the user interface, inference engine and database operate on one or more server computers to serve web pages to a client computer having a browser operated by the user.

4. The expert system claimed in claim 1, wherein the inference engine subsystem determines whether query relates to a knowledge-based solution or an expert consultation-based solution by matching keyterms in the query.

5. The expert system claimed in claim 4, wherein the inference engine subsystem matches description-oriented keyterms in the query to determine if the query relates to a knowledge-based solution.

6. The expert system claimed in claim 5, wherein the description-oriented keyterms relate to at least one of: "what is"; "what are"; "where is"; "where are"; "how many"; "how long"; "how to"; "how do I"; "tell about"; and "describe".

7. The expert system claimed in claim 4, wherein the inference engine subsystem matches reasoning-oriented keywords in the query to determine if the query relates to an expert consultation-oriented solution.

8. The expert system claimed in claim 7, wherein the reasoning-oriented keyterms relate to: "why".

9. The expert system claimed in claim 1, further comprising a feedback subsystem for updating the database in response to receiving feedback information from a user.

10. The computer program product claimed in claim 1, further comprising feedback subsystem code for updating the database in response to receiving feedback information from an engineer user.

11. A computer readable medium in which is tangibly embodied computer program steps for aiding engineering personnel in a contact lens manufacturing, the computer program steps comprising:

user interface code for receiving a query from a user regarding an element of a business entity's industrial environment in which the user works in a contact lens manufacturing capacity;

database code containing information describing aspects of elements of the business entity's industrial environment;

inference engine code for receiving the query via the user interface and obtaining solution information from the database by matching keyterms in the query, wherein the user interface outputs the solution information to the user;

the inference engine code matches keyterms in the query with keyterms associated with rules to select a rule from the database; and the inference engine code obtains a further question from the database associated with the selected rule;

the user interface code prompts the user to answer the further question; and the inference engine code determines if solution information associated with a user's answer to the further question is available in the database.

12. The computer program product claimed in claim 11, wherein the user interface code and inference engine code are included in active server pages (ASP).

13. The computer program product claimed in claim 11, wherein the inference engine code determines whether query relates to a knowledge-based solution or an expert consultation-based solution by matching keyterms in the query.

14. The computer program product claimed in claim 13, wherein the inference engine code matches description-oriented keyterms in the query to determine if the query relates to a knowledge-based solution.

15. The computer program product claimed in claim 14, wherein the description-oriented keyterms relate to at least one of: "what is"; "what are"; "where is"; "where are"; "how many"; "how long"; "how to"; "how do I"; "tell about"; and "describe".

16. The computer program product claimed in claim 13, wherein the inference engine code matches reasoning-oriented keywords in the query to determine if the query relates to an expert consultation-oriented solution.

17. The computer program product claimed in claim 16, wherein the reasoning-oriented keyterms relate to: "why".

* * * * *